US010583931B2

United States Patent
Cline et al.

(10) Patent No.: US 10,583,931 B2
(45) Date of Patent: Mar. 10, 2020

(54) SYSTEM AND METHOD FOR COORDINATED CONTROL OF A POWER SYSTEM

(71) Applicants: Rolls-Royce Corporation, Indianapolis, IN (US); Rolls-Royce North American Technologies, Inc., Indianapolis, IN (US)

(72) Inventors: Curtis H. Cline, Brownsburg, IN (US); Michael J. Armstrong, Avon, IN (US)

(73) Assignees: Rolls-Royce North American Technologies, Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 661 days.

(21) Appl. No.: 14/585,888

(22) Filed: Dec. 30, 2014

(65) Prior Publication Data

US 2015/0191252 A1 Jul. 9, 2015

Related U.S. Application Data (60) Provisional application No. 61/921,930, filed on Dec. 30, 2013.

(51) Int. Cl.
*F02C 6/14* (2006.01)
*B64D 31/12* (2006.01)
(Continued)

(52) U.S. Cl.
CPC ............ *B64D 31/12* (2013.01); *F01D 15/10* (2013.01); *F02C 6/14* (2013.01); *F02C 7/32* (2013.01);
(Continued)

(58) Field of Classification Search
CPC ...... F02C 6/14; F02C 7/36; F02C 9/00; F02C 9/48; F05D 2220/60; F05D 2260/42; F05D 2270/05; F05D 2270/051; F05D 2270/06; F05D 2270/20; F05D 2270/335
See application file for complete search history.

(56) References Cited

U.S. PATENT DOCUMENTS 7,188,475 B2   3/2007   McGinley et al.
7,285,871 B2   10/2007   Derouineau
(Continued)

FOREIGN PATENT DOCUMENTS

EP   798454 A2   10/1997
EP   1990519 A2   11/2008
EP   2881563 A1   6/2015

OTHER PUBLICATIONS

Article; Aircraft Batteries; Aviation Pros.com; Article No. 10271585 dated Jan. 2, 2017.
European Search Report for EP14198448 dated May 15, 2015.

*Primary Examiner* — Arun Goyal
(74) *Attorney, Agent, or Firm* — Fishman Stewart PLLC (57) ABSTRACT

An integrated gas turbine engine, electrical power subsystem and thermal management subsystem for aerospace application includes a first motor/generator coupled to a low pressure (LP) shaft of the gas turbine engine, a second motor/generator coupled to a high pressure (HP) shaft of the gas turbine engine, and a system controller coupled to each of the gas turbine engine, a first motor generator and a second motor/generator, wherein the controller receives engine thrust demand and electrical power demand and is programmed to determine total system power demand and the amount of power sharing between the first motor/generator and the second motor/generator to meet thrust and electrical power demand.

20 Claims, 6 Drawing Sheets

(51) Int. Cl.
    *F02C 7/32*    (2006.01)
    *F02C 9/48*    (2006.01)
    *F01D 15/10*   (2006.01)
    *F02C 7/36*    (2006.01)
    *F02C 9/00*    (2006.01)

(52) U.S. Cl.
    CPC ............... *F02C 7/36* (2013.01); *F02C 9/00* (2013.01); *F02C 9/48* (2013.01); *F05D 2220/60* (2013.01); *F05D 2220/76* (2013.01); *F05D 2260/42* (2013.01); *F05D 2270/05* (2013.01); *F05D 2270/335* (2013.01)

(56) References Cited

U.S. PATENT DOCUMENTS

| | | |
|---|---|---|
| 7,406,370 B2 | 7/2008 | Kojori et al. |
| 7,882,691 B2 | 2/2011 | Lemmers, Jr. et al. |
| 7,926,287 B2 | 4/2011 | Ullyott et al. |
| 8,155,876 B2 | 4/2012 | White et al. |
| 8,201,414 B2 | 6/2012 | Haehner et al. |
| 8,971,064 B2* | 3/2015 | Pena ............... F02C 1/00 290/1 R |
| 9,267,438 B2* | 2/2016 | Dooley ............. F02C 7/26 |
| 2006/0042252 A1 | 3/2006 | Derouineau |
| 2006/0150633 A1 | 7/2006 | McGinley et al. |
| 2006/0174629 A1 | 8/2006 | Michalko |
| 2010/0083632 A1* | 4/2010 | Foster ............. B64D 27/16 60/39.181 |
| 2010/0251726 A1 | 10/2010 | Jones et al. |
| 2013/0098060 A1 | 4/2013 | Suciu et al. |
| 2013/0139518 A1 | 6/2013 | Morgan |
| 2014/0271117 A1* | 9/2014 | Armstrong .......... F02C 7/32 415/1 |
| 2017/0036768 A1* | 2/2017 | Stieger ............. B64D 41/00 |

\* cited by examiner

SYSTEM AND METHOD FOR COORDINATED CONTROL OF A POWER SYSTEM

CROSS-REFERENCE TO RELATED APPLICATIONS

This application claims priority to U.S. Provisional Patent Application No. 61/921,930, filed Dec. 30, 2013, the contents of which are hereby incorporated in their entirety.

FIELD OF TECHNOLOGY

An improved integrated design and control of a gas turbine is disclosed. More particularly, performance and efficiency are improved by optimizing size and usage of components of a gas turbine, the components including propulsion, thermal, electrical, and control systems, as examples. The improvements are applicable to turbines used for propulsive power in marine, land, air, and underwater applications, as examples.

BACKGROUND

It has become increasingly desirable to improve the overall system design and operation of gas turbines. In a system having a typical gas turbine engine, electrical power is extracted via an electrical generator to supply electrical power to platform loads, such as control systems, actuators, weapons systems, climate control systems, and the like. Electrical storage, such as a battery, is typically provided to operate such systems when the gas turbine engine is not running or to provide power for starting the gas turbine engine. In some known gas turbine engines, the gas turbine engine includes a high pressure shaft and a lower pressure shaft, and the electrical generator is coupled to one of the high and low pressure shafts.

Typically, strategies for controlling a system, having a gas turbine engine and electric generators driven by each shaft of the engine, include treating the engine and the generators as separate systems. That is, their respective control systems operate without knowledge of or interaction with each other. This can lead to treating cross-coupling effects between the gas turbine engine and electric generators as disturbances. For systems using relatively larger electric motors/generators capable of additional electrical power generation and motoring, this approach can lead to controller conflicts and will result in suboptimal control of the system.

Overcoming these concerns is desirable and will save the industry substantial resources.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

An exemplary gas turbine engine and schematic of an electrical system coupled thereto are described herein and are shown in the attached drawings. The electrical system includes at least two generator circuits, one coupled to a high pressure portion of a gas turbine engine and the other coupled to a low pressure portion of the gas turbine engine. Further, although illustrative examples are described with respect to a two-shaft engine, and two corresponding motor/generators, it is contemplated that the disclosure pertains to other gas turbine designs, such as a three shaft engine.

According to one example, an electrical power and thermal management system for a gas turbine engine includes a first motor/generator coupled to a low pressure (LP) shaft of the gas turbine engine, a second motor/generator coupled to a high pressure (HP) shaft of the gas turbine engine, and a system controller coupled to the gas turbine engine, first motor generator, and second motor/generator, wherein the controller receives engine thrust demand, electrical power demand and is programmed to determine total system power demand and the amount of power sharing between the first motor/generator and the second motor/generator to meet thrust and electrical power demand. The controller is further programmed to control the gas generator portion of the gas turbine engine using the total system power demand as a control variable. Control of faster, more responsive electric machines is accomplished by the controller to meet the transient demands for thrust and electrical power. The LP electric machine is controlled to achieve transient LP shaft speed/thrust control via the application of motoring, braking, motoring release, or braking release of the LP shaft. Further, the engine is controlled with electric machines connected to each of its shafts as an integrated, multivariable propulsion and power system. The disclosed subject matter takes advantage of cross-coupling effects and commands changes in one subsystem to produce desired changes in another subsystem. Thus, each subsystem is moved (individually or simultaneously) from one steady-state operating point to another steady-state operating point while achieving system level performance and stability goals.

Control may be via a non-transitory computer-readable medium having instructions to determine an amount of power sharing between a first motor/generator and a second motor/generator to meet a power demand, wherein the first motor/generator is coupled to a low pressure (LP) shaft of the gas turbine engine, and the second motor/generator is coupled to a high pressure (HP) shaft of the gas turbine engine.

According to another example, a method of controlling an electrical power and thermal management system for a gas turbine engine, comprising determining an amount of power sharing between a first motor/generator and a second motor/generator to meet a power demand, wherein the first motor/generator is coupled to a low pressure (LP) shaft of the gas turbine engine, and the second motor/generator is coupled to a high pressure (HP) shaft of the gas turbine engine.

Figure 1:
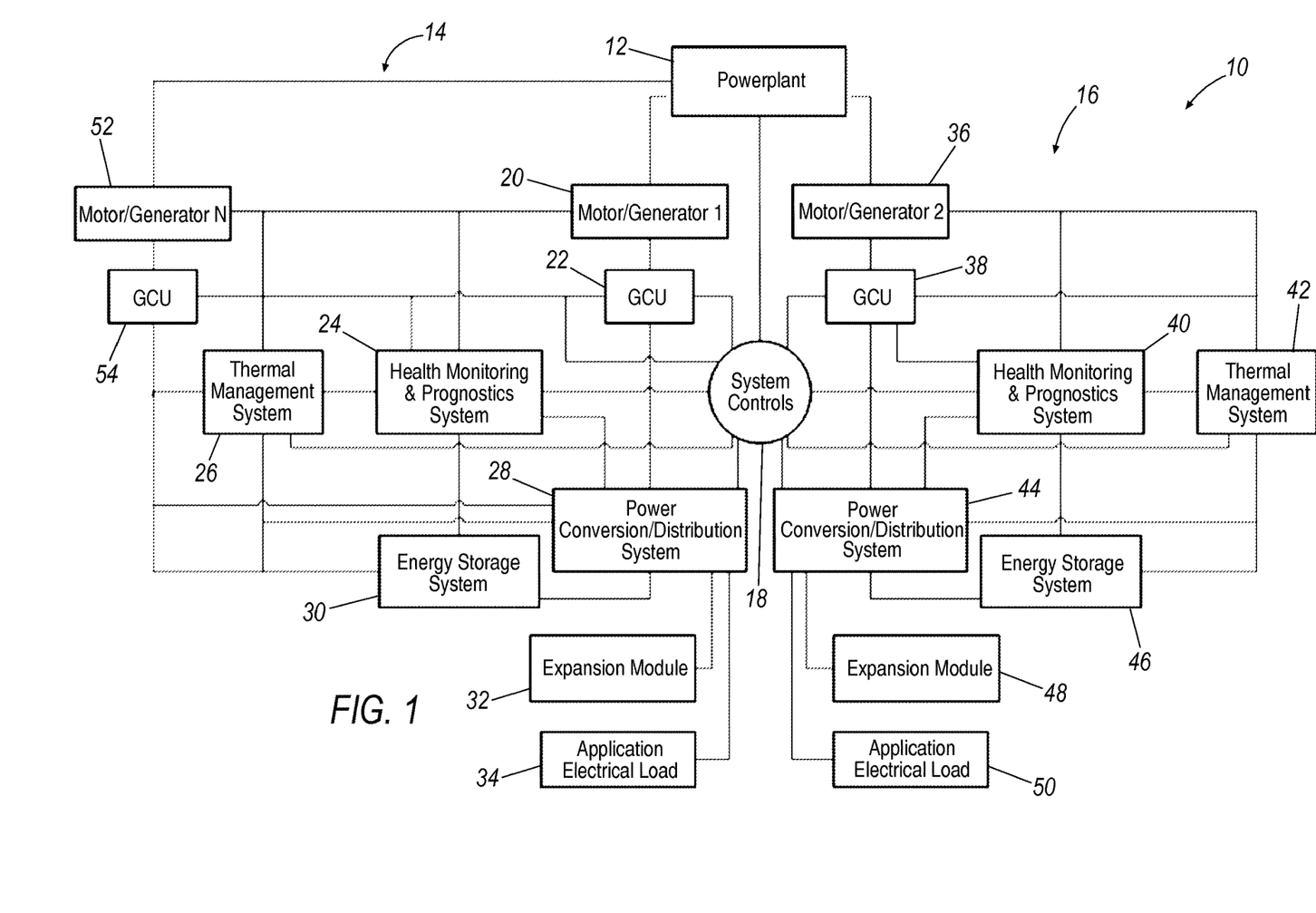
FIG. 1 is a functional block diagram illustration of an integrated gas turbine engine, electrical power subsystem and thermal management subsystem, according to one example.

FIG. 1 illustrates an integrated system 10 in which a power plant or engine 12, such as a gas turbine engine, provides shaft power to a first power circuit 14 and a second power circuit 16. A system controller 18 is coupled to engine 12 and also to first and second circuits 14, 16. First power circuit 14 includes a motor/generator 20 and a Generator Control Unit (GCU) 22 coupled thereto. GCU 22 is also coupled to other components within first power circuit 14, such as a health monitoring and prognostics system 24, a thermal management system 26, and a power conversion/distribution system 28. First power circuit 14 also includes an energy storage system 30, an expansion module 32, and application electrical load(s) 34. System controller 18 is configured to regulate power flow (such as electrical currents and voltages within system 10) to provide power to various electrical busses or to a platform bus that provides electrical power to system electrical components. The power may be DC, AC, or conversion therebetween. System controller 18 may also be configured to execute computer program instructions to control the operation of engine 12, including fuel flow, or the position of any variable geometry systems (e.g., from the flight control system of an aircraft or from a steering system of a ship).

Health monitoring and prognostics system 24 is generally a unit that monitors the health of system components, and may be used to estimate component life based on sensor feedback received from components within engine 12. Thermal management system 26 includes pumps, expansion valves, and the like, as well as a controller, to provide coolant for the purposes of component cooling, and other system operations. Power conversion/distribution system 28 receives electrical power from motor/generator 20 via GCU 22, and converts the power to a more useable form such as a DC voltage for storage in energy storage system 30, expansion module 32, and application electrical load(s) 34. The energy storage system 30 may include a battery or other energy storage system. Energy storage system 30 stores energy for providing power when engine 12 is not running (i.e., not generating power), but also to provide power to motor/generator 20 to provide starting power to engine 12 during startup. The energy storage system may also provide power during engine operation to supplement electrical power delivered. Expansion module 32 and application electrical load 34 represent additional electrical components that receive power from power conversion/distribution system 28.

Second power circuit 16 similarly includes a motor/generator 36 and a GCU 38 coupled thereto. GCU 38 is also coupled to other components within second power circuit 16, such as a health monitoring and prognostics system 40, a thermal management system 42, and a power conversion/distribution system 44. Second power circuit 16 also includes an energy storage system 46, an expansion module 48, and application electrical load(s) 50. The components 36-50 of second power circuit 16 are similarly arranged as described with respect to first power circuit 14. Additionally, in one example electrical system 10 includes one or more additional motor/generators 52 and corresponding GCUs 54 as well, which may be coupled to a gas turbine engine as will be further described. Thus, the system 10 is modular and flexible in that it may be expanded to include a number N of motor/generators based on contemplated operating conditions.

Figure 2:
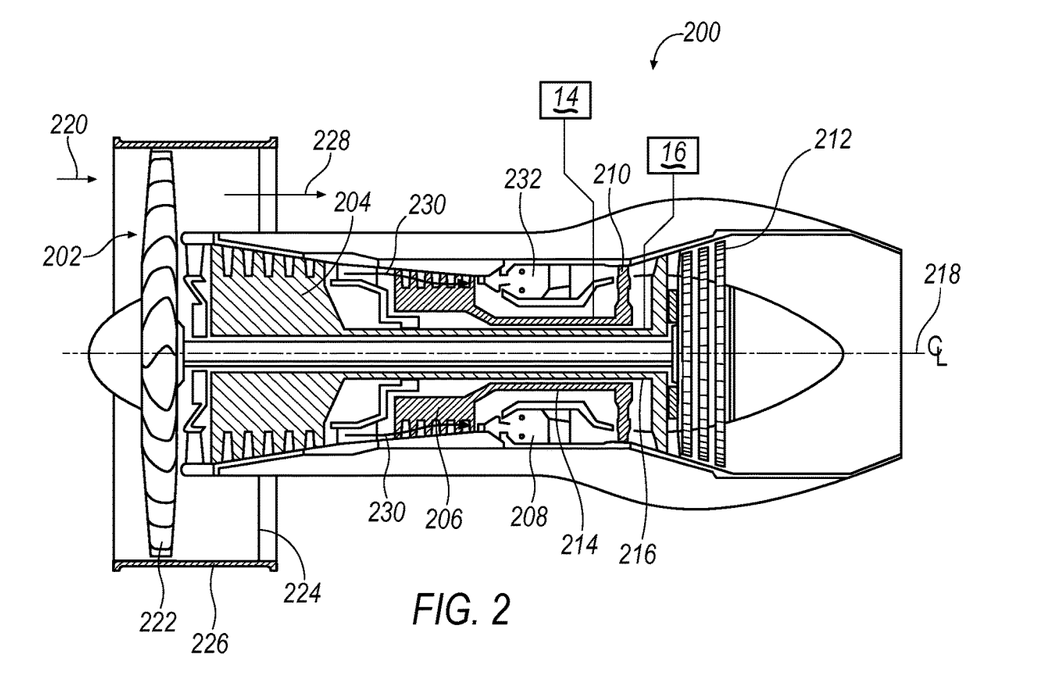
FIG. 2 illustrates an exemplary gas turbine engine that is integrated with the electrical power and thermal management subsystems illustrated in FIG. 1.

FIG. 2 illustrates a gas turbine engine 200, which includes a fan 202, a low pressure compressor and a high pressure compressor, 204 and 206, a combustor 208, and a high pressure turbine and low pressure turbine, 210 and 212, respectively. The high pressure compressor 206 is connected to a first rotor shaft 214 while the low pressure compressor 204 is connected to a second rotor shaft 216. The shafts extend axially and are parallel to a longitudinal center line axis 218. Ambient air 220 enters the fan 202 and is directed across a fan rotor 222 in an annular duct 224, which in part is circumscribed by fan case 226. Bypass airflow 228 provides engine thrust while a primary gas stream 230 is directed to a combustor 232 and the high pressure turbine 210.

First and second rotor shafts 214, 216, are coupled, respectively, to first and second power circuits 14, 16, as illustrated in FIG. 1. Thus, first and second power circuits 14, 16 are configured to split power between motor/generators 20, 36 so that each provides a portion of the power demand. As such, a power sharing/transfer arrangement between motor/generators 20, 36 provides the platform power demand, and includes a capability to provide power to one of the shafts 214, 216, as necessary. Such arrangement also provides an ability to optimize load shedding and a demand side management of the power requirement. Thus, life and performance considerations may be taken into account in real-time and optimized to actively seek and obtain performance optima while equipment is in operation.

Disclosed herein is a strategy for the coordinated, transient control of Integrated Propulsion and Power Systems (IP&PS), and a method for moving an IP&PS from one operating point to another operating point. The IP&PS corresponds generally to the exemplary integrated system of FIG. 1 and the exemplary gas turbine engine of FIG. 2.

An IP&PS is an integration of individual propulsion and power subsystems. It includes a thrust producing gas turbine engine having electric motors/generators (electric machines) driving/driven by each shaft of the engine. At steady-state, the IP&PS provides thrust and electrical power to a platform. Some proportion of the total electrical power is supplied by each shaft mounted electric machine (such as motor/generators 20 and 36) while thrust is provided by a fan or propeller (such as fan rotor 222) and an exhaust nozzle (aft of low pressure turbine 212).

Alternatively, one (or more) shaft mounted electric machines (20, 36) may drive its respective shaft (214, 216), or may be coupled to the shaft illustrated that couples fan 202 to low pressure turbine 212, while the other shaft mounted electric machine (20, 36) supplies some proportion of the total electrical power. Cross-coupling effects exist between the integrated subsystems of an IP&PS. As such, the disclosed subject matter takes advantage of the cross-coupling effects and commands changes in one subsystem to produce desired changes in another subsystem. Thus, each subsystem is moved (individually or simultaneously) from one steady-state operating point to another steady-state operating point while achieving system level performance and stability goals.

Referring to FIGS. 1 and 2, the slower responding gas generator is controlled to meet total system power demands. Total system power demand is the thrust demand plus the electrical power demand plus auxiliary and accessory power demands, and is controlled via fuel flow control. For the purposes of the present disclosure, total system power demand will be discussed in terms of thrust demand and electrical power demand.

The faster, more responsive electric machines are controlled to meet the transient demands for thrust and electrical power. Specifically, the HP machine is controlled to supply electrical power to the platform bus. The LP machine is controlled to set the LP shaft speed to deliver desired thrust while supplying electrical power to the platform bus. To achieve shaft speed control, the LP machine is used to apply motoring or braking to the LP shaft. This is done in addition to the torque applied by the combustion gases. The LP machine provides electrical power to support the bus when it is used for braking or during steady-state power generation operation. Total HP and LP electrical power generation is used to meet the total platform electrical power demand as well as maintain charged energy storage, in a system that includes an energy storage capability. Energy storage is controlled to help maintain the platform bus during transient conditions. Platform electrical loads, shaft mounted electric machines, and energy storage modules are connected to the bus.

According to the disclosure, the transient control of a gas generator in an aerospace application uses total system power demand, as opposed to the control of a gas generator in an aerospace application using thrust or some indicator of thrust demand. Also disclosed is the combined control of a gas generator to meet total system power demands, and control of faster, more responsive electric machines to meet the transient demands for thrust and electrical power in an aerospace application. In one example, with respect to the electric machines, the LP electric machine is controlled to achieve transient LP shaft speed/thrust control, via the application of motoring, braking, motoring release, or braking release to the LP shaft. Further, the engine is controlled with electric machines connected to each of its shafts as an integrated, multivariable propulsion and power system, as opposed to controlling each system separately with cross-coupling effects being dealt with as disturbances.

Power demand within an aircraft includes a thrust demand and an electrical demand, as examples. Thrust demand may be either in the form of an acceleration or a deceleration, and electrical demand may be in the form of an increased or a decreased amount of demand. Thus, disclosed herein is an integrated gas turbine engine, electrical power subsystem, and thermal management subsystem that includes a first motor/generator coupled to a low pressure (LP) shaft of the gas turbine engine, a second motor/generator coupled to a high pressure (HP) shaft of the gas turbine engine, and a system controller coupled to each of the gas turbine engine, first motor generator, and second motor/generator, wherein the controller receives engine thrust demand, electrical power demand and is programmed to determine total system power demand and the amount of power sharing between the first motor/generator and the second motor/generator to meet thrust and electrical power demand. The controller is further programmed to control the gas generator portion of the gas turbine engine using the total system power demand as the control variable. Control of faster, more responsive electric machines is accomplished by the controller to meet the transient demands for thrust and electrical power. The LP electric machine is controlled to achieve transient LP shaft speed/thrust control via the application of motoring, braking, motoring release, or braking release of the LP shaft. Further, the engine is controlled with electric machines connected to each of its shafts as an integrated, multivariable propulsion and power system.

Acceleration

Figure 3A:
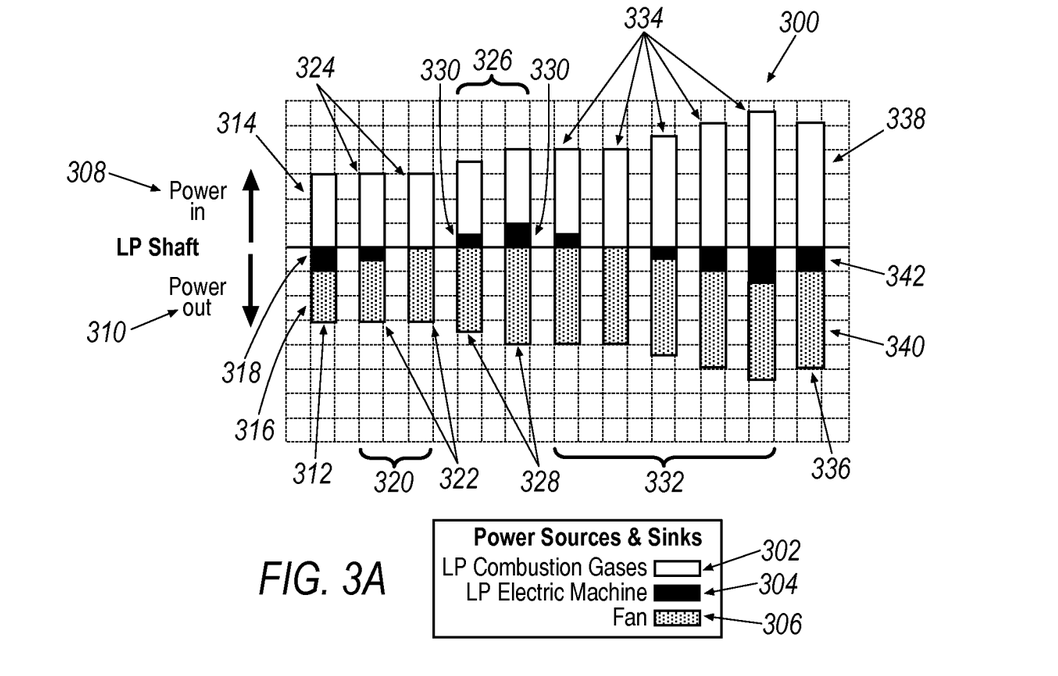
FIGS. 3A and 3B illustrate a series of operating points for a gas turbine engine undergoing a thrust acceleration.

FIG. 3A illustrates an exemplary set of thrust control response columns 300 that show power balance on an LP shaft during engine acceleration. Magnitudes of the columns 300 are shown relative to one another in order to illustrate performance and output relative to one another, and each of the columns represents a combination of LP combustion gas power, LP electric machine power, and fan power. For instance, LP combustion gases are illustrated as cross-section 302, LP electric machine is cross-section 304, and fan power is cross-section 306. Power-in 308 is a vertical curve that represents power that is available to the system, and power-out 310 is another vertical, in a direction opposite that of power-in 308, that represents power to the fan for thrust as well as power to the LP electric machine.

To illustrate, column 312 shows an exemplary operating point of the LP shaft in which LP combustion gases 314 are providing power to the input shaft which, in one system corresponds to the shaft to which the fan is attached, and to which an electric motor/generator is coupled. The magnitude of LP combustion gases 314 corresponds to the same output magnitude, which includes fan power 316 and LP electric machine power 318. Thus, column 312 illustrates an operating point in which LP combustion gases provide thrust through the fan and also provide electrical power to the system through the LP electric machine.

According to the disclosure, and to provide quick transient response to a thrust demand or to provide overall improved power sharing, the LP electric machine may be operated as a result to a change in overall power demand. For instance and as stated, column 312 represents that excess power from the LP shaft is provided from LP combustion gases, providing both fan power and power to the LP electric machine. Columns 320 show a response to an increasing thrust demand that is met by simply decreasing the amount of power to the LP electric machine. Columns 320 illustrate increasing fan output 322 (therefore an acceleration), while the amount of power from the LP combustion gases remains essentially constant 324. Thus, thrust power is provided rapidly and during a transient thrust event by simply decreasing an amount of power to the LP electric machine (i.e., decreasing its generator mode operation).

Columns 326 illustrate yet additional rapid acceleration or thrust capability. Increasing thrust 328 is provided by reversing operation of the LP electric machine and operating it in a motoring mode. To do so, power is provided to the LP shaft by drawing power from, for instance, energy storage or from an HP electric machine, providing an increasing electrical power 330 to the LP shaft. Thus, columns 312, 320, and 326 illustrate a shift of operation of the LP electric machine from energy generation mode to motoring mode, by first decreasing the amount of energy generation and then providing power to the LP electric machine. Because the operation of the LP electric machine is much more rapid than that of the combustion gases, selective operation of the LP electric machine thereby provides a quick and efficient transient response to an acceleration demand. In the corresponding columns 312, 320, and 326, the magnitude of the combustion gases is shown as constant, representing the relatively quick response time of the electric machine against a response time of the combustion gases. In other words, although the magnitude of the combustion gases is shown as constant, it is contemplated that the demand for combustion may nevertheless be increasing concurrent with the change in electrical demand, but the combustion power output has not yet changed due to its relatively slow response time.

Columns 332 illustrate a further response and return to steady state operation and increased power output as the power into the LP shaft from the LP combustion gases increases 334. That is, as the power from the combustion gases increases 334 in its relatively longer response time compared to the LP electric machine, the corresponding power to the fan can be maintained as relatively constant during the process by controlling the operation of the LP electric machine. Column 336 thereby represents a steady-state operation having an increased thrust in comparison to that in column 312. The combustion power is thereby balanced with the fan thrust 340 and the LP electric power output 342.

Figure 3B:
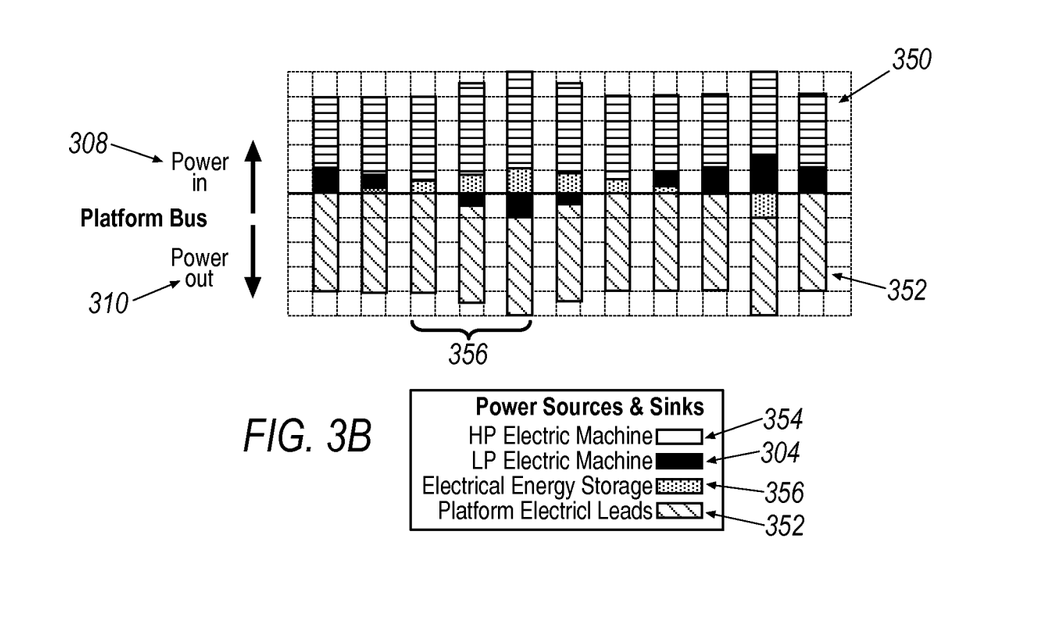

FIG. 3B illustrates response columns 350 that correspond with the columns 300 of FIG. 3A. Columns 350 show platform electrical loads 352 that remain relatively constant during the acceleration process, and therefore show an exemplary and corresponding response of the HP electrical machine 354 and the power to and from electrical energy storage 356. As stated, system 10 may not have electrical storage, in which case the transient electrical responses are accommodated by changing the electrical loads to and from the LP and HP motor/generators. However, in the illustration of FIG. 3B, electrical storage is provided, thus showing how, with an essentially unchanging electrical platform load (i.e., overall electrical requirements for plane operation, system and cabin cooling, avionics operation and cooling, etc.), the acceleration or thrust needs are met by controlling the operation of the HP electric machine and the amount of energy storage.

As such, because the total system power demand has increased due to the increased thrust demand, fuel flow is increased towards the level which meets the new, total system power demand. This includes power needed to recharge the energy storage module. As the torque applied to the LP shaft by the combustion gases increases, the motored torque is decreased from the LP electric machine. As the combustion gases gradually become the sole driving torque, the LP electric machine is gradually transitioned from motoring to generating. An energy optimization algorithm will provide the appropriate set-points for the allocation of electrical power extraction from the HP and LP machines. At steady-state, the allocations will be achieved, meeting the constant electrical power demand, the new thrust demand, and attaining the fuel flow setting which meets the new, total system power demand.

Deceleration

Figure 4A:
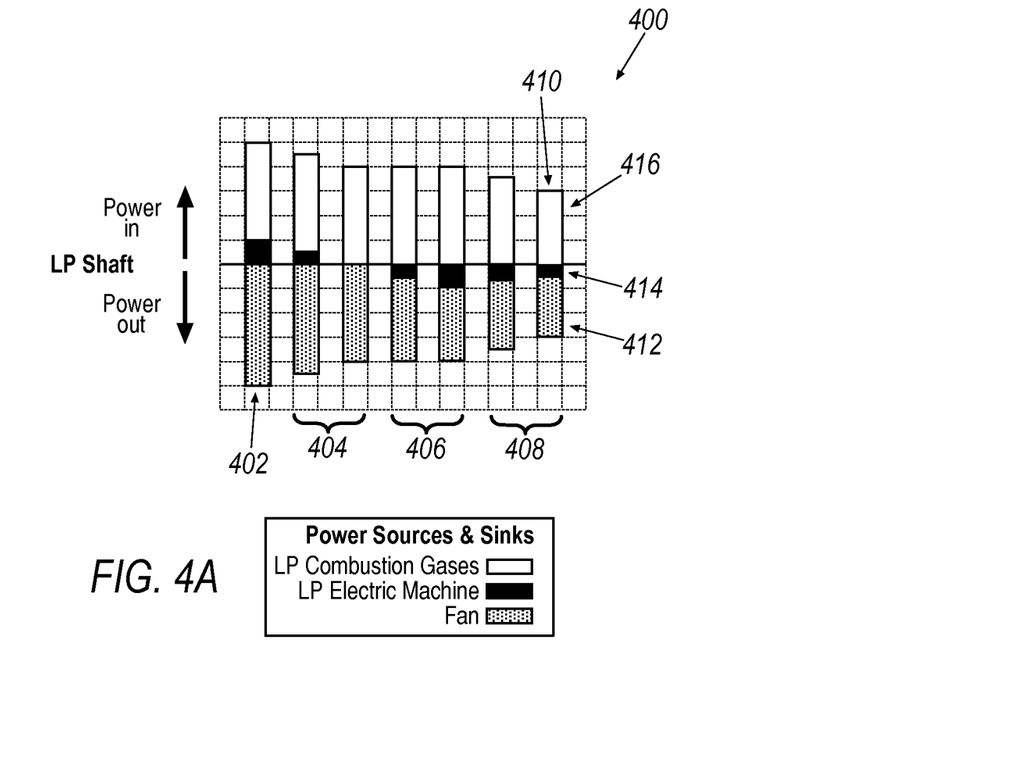
FIGS. 4A and 4B illustrate a series operating points for a gas turbine engine undergoing a thrust deceleration.

Referring to FIG. 4A and in similar fashion to the acceleration control, a deceleration is illustrated 400 that may be in response to a decreased thrust demand. Beginning with a situation 402 in which the LP machine is in motoring mode, electrical power to the LP electric machine is decreased 404, which removes positive torque from the shaft and results in deceleration. For further deceleration, electrical power is extracted from the LP machine 406, causing braking of the LP shaft, and stepping 408 to a new steady-state condition 410 of reduced thrust 412, energy storage 414, and a corresponding balance of LP combustion power 416.

Figure 4B:
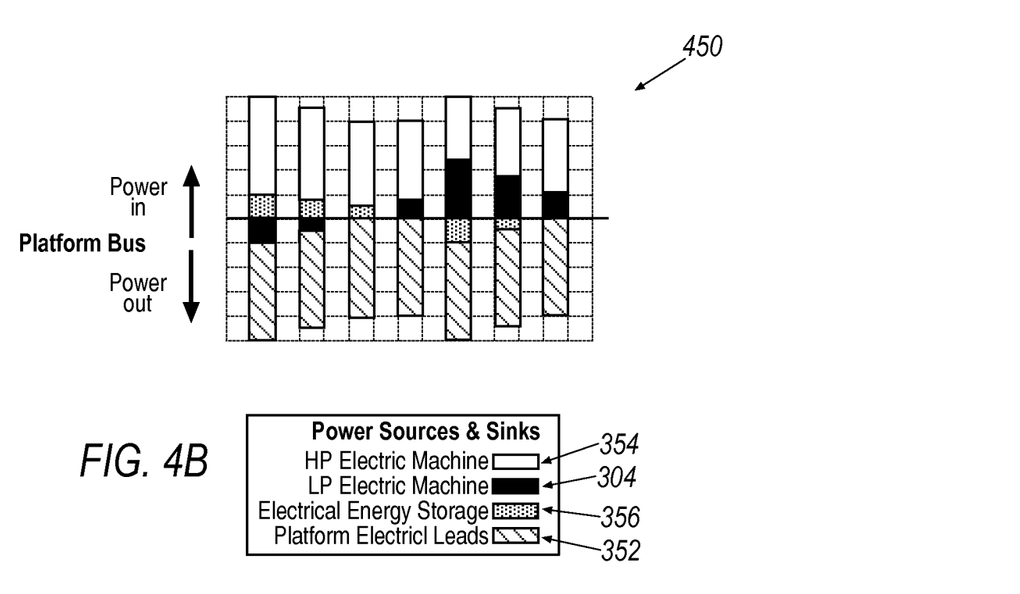

For a generally constant platform electrical load, referring to FIG. 4B at 450, to accommodate the power now being supplied by the LP machine, less power is extracted from the HP machine and the energy storage module is charged if it is needed. Since the total system power demand has decreased due to the decreased thrust demand, fuel flow is decreased as well towards the level which meets the new total system power demand. As the torque applied to the LP shaft by the combustion gases decreases, electrical power extracted from the LP machine correspondingly decreases. Thus, FIG. 4B illustrates a corresponding example in which electric machine power and energy storage may be selectively controlled to achieve vehicle deceleration in a fast transient scenario.

Increased Electrical Power Demand

Figure 5A:
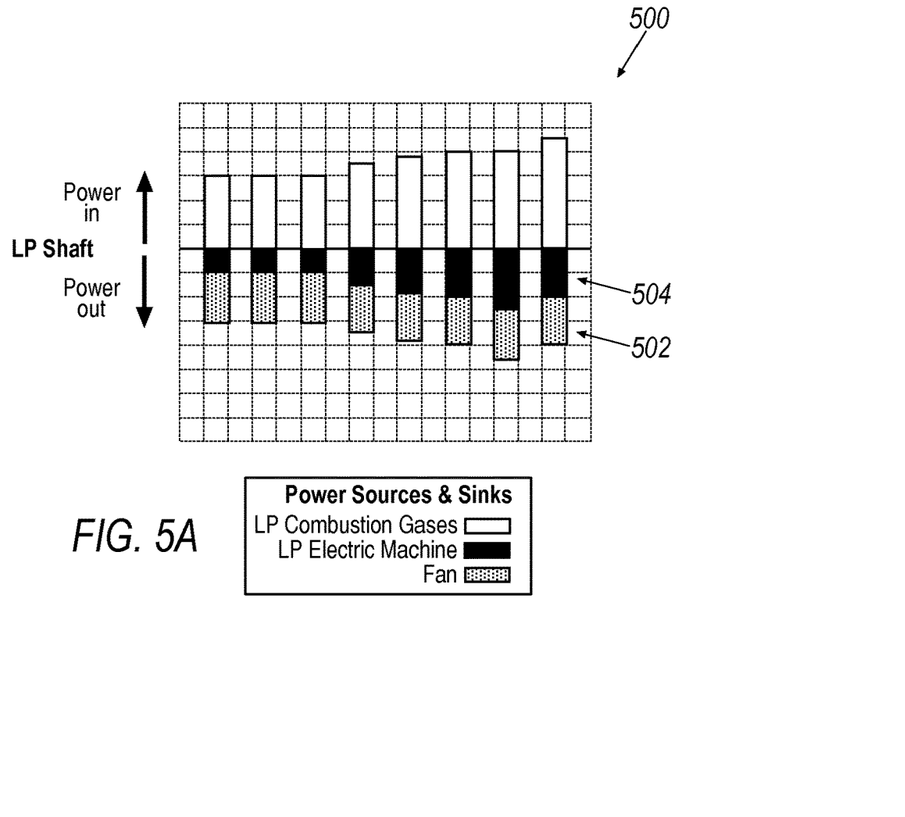
FIGS. 5A and 5B illustrate a series operating points for a gas turbine engine undergoing an increased electrical power demand.
Figure 5B:
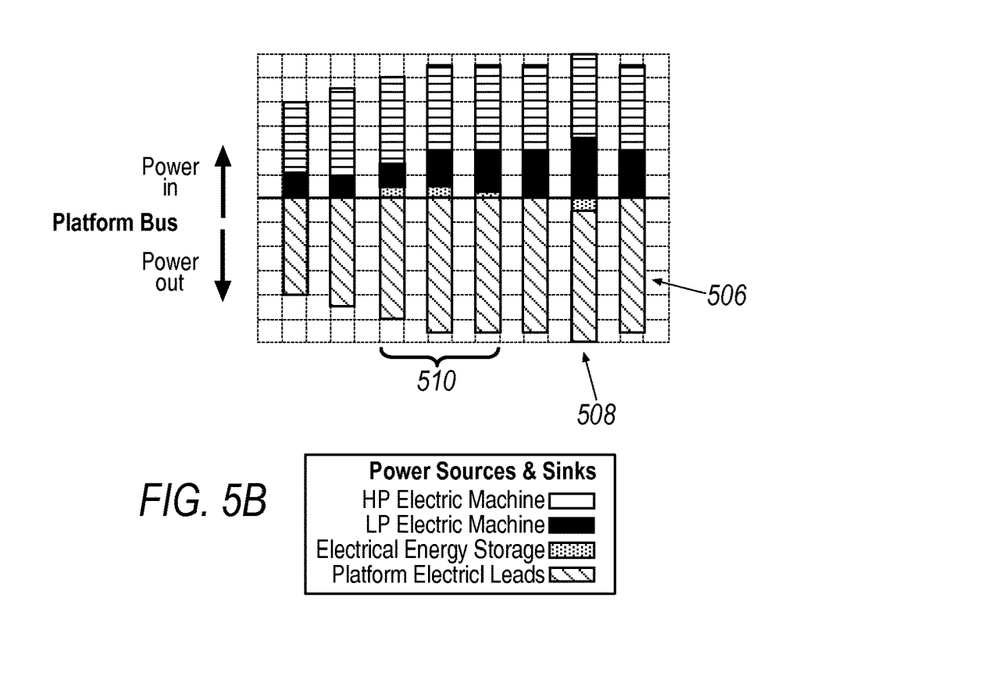

FIG. 5A illustrates 500 an example of a thrust load 502 in a fan that remains constant, while the power out of the LP shaft to the LP electric machine is increased 504 to accommodate an increased electrical power demand (platform electrical load). FIG. 5B illustrates the increasing electrical power demand 506 that is accommodated by correspondingly altering operation of the LP and HP electrical machines, as well as the amount of energy storage 508 or draw 510.

To supply more electrical power to the platform bus in response to an increased electrical load demand, an increased amount of electrical power is extracted from the HP machine to supply power to the bus from the energy storage module. Since the total system power demand has increased due to the increased electrical power demand, fuel flow is increased towards the level which meets the new, total system power demand. As the torque applied to the LP shaft by the combustion gases increases, the electrical power extracted from the LP machine increases to maintain the shaft at a constant speed. The increased power supplied by the LP machine will gradually replace the electrical power supplied by the energy storage module during this transient. Eventually, the energy storage module will not be supplying electrical power to the bus. Rather, the bus will be supplying electrical power to the energy storage module to recharge it 508. At steady-state, the disclosed invention will achieve these allocations, meet the new electrical power demand, meet the constant thrust demand, and attain the fuel flow setting which meets the new, total system power demand (constant thrust demand plus the increased electrical power demand).

Decreased Electrical Power Demand

Figure 6A:
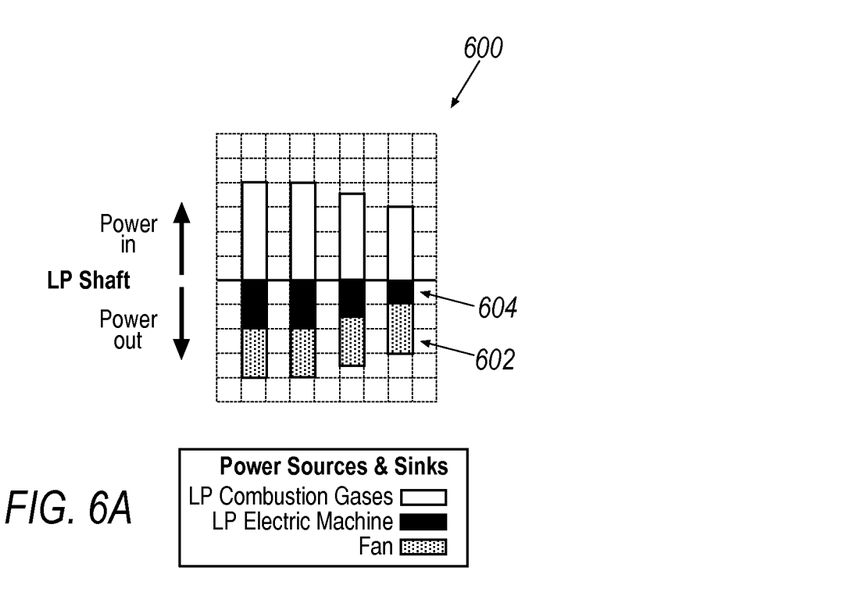
FIGS. 6A and 6B illustrate a series operating points for a gas turbine engine undergoing a decreased electrical power demand.
Figure 6B:
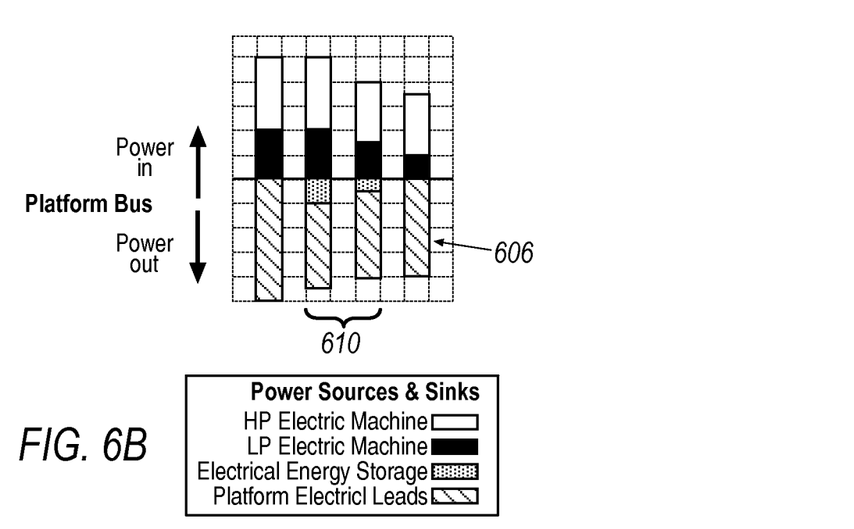

FIG. 6A illustrates 600 an example of a thrust load 602 in a fan that remains constant, while the power out of the LP shaft to the LP electric machine is decreased 604 to accommodate a decreased electrical power demand (platform electrical load). FIG. 6B illustrates the decreasing electrical power demand 606 that is accommodated by correspondingly altering operation of the LP and HP electrical machines, as well as the amount of energy storage 608.

Less electrical power is extracted from the HP machine and the energy storage module is recharged if needed. Since the total system power demand has decreased due to the decreased electrical power demand, fuel flow is decreased towards the level which meets the new, total system power demand. As the torque applied to the LP shaft by the combustion gases decreases, the electrical power extracted from the LP machine to maintain this shaft at a constant speed decreases. At steady-state, the proper allocations are achieved, meeting the new electrical power demand, meeting the constant thrust demand, and attaining the fuel flow setting which meets the new, total system power demand (constant thrust demand plus the decreased electrical power demand).

Thus, disclosed is a method/control algorithm/controller for moving an integrated system from one steady-state point to another steady-state point while achieving system level performance and stability goals. To accomplish the above, a control algorithm collectively moves each component in a coordinated fashion from one steady-state point to another steady-state point.

Affecting the LP shaft and the electric machine coupled to that shaft are one aspect of the disclosure. However, disclosed also is a slower responding gas generator that is controlled to meet total system power demands. Total system power demand is the thrust demand plus the electrical power demand (plus auxiliary and accessory power demands). Total system power is controlled via fuel flow control.

In operation, faster, more responsive electric machines are controlled to meet the transient demands for thrust and electrical power. The LP shaft and the electric machine are controlled as follows:

The LP machine is controlled to set the LP shaft speed to deliver desired thrust and to supply electrical power to the platform bus. To achieve shaft speed control, the LP machine is used to apply motoring or braking to the LP shaft. This is done in addition to the torque applied by the combustion gases. When being used to increase the thrust output (motoring/accelerating the LP shaft), the LP electric machine consumes power from the bus and the bus is supplied electrical power from the HP electric machine and the energy storage unit. When being used to decrease the thrust output (braking/decelerating the LP shaft), the LP electric machine supplies power to the bus. During steady-state operation, the LP machine supplies power to the bus. The LP machine, in one example, may only be used as a motor during transients to increase the thrust output of the gas turbine engine from one steady-state to anther steady-state. The effect of the combustion gases on the LP turbine will maintain thrust output at the new steady-state and maintain electrical power generation from the LP machine.

Thus, in one example, an LP electric machine is controlled to achieve transient thrust control, via the application of motoring or braking to the LP shaft. In another example, a system is controlled to control a transient control of a gas generator in an aerospace application using total system power demand, and in the example of aerospace applications, the gas generator is controlled by only a thrust demand. In another example, the combined control of a gas generator meets both 1) total system power demands, and 2) the control of the faster, more responsive electric machines to meet the transient demands for thrust and electrical power in an aerospace application. Thus, in general, an engine is controlled with electric machines that are connected to each of its shafts, and in one example an energy storage unit is included, such that the system is as an integrated, multivariable system taking advantage of the cross-coupling effects between the individual components and commanding changes in one component to produce desired changes in another component.

Computing devices such as system 10 generally include computer-executable instructions such as the instructions of the system controller 18, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. An integrated gas turbine engine, electrical power subsystem and thermal management subsystem for aerospace application, comprising:
   a first motor/generator coupled to a low pressure (LP) shaft of the gas turbine engine;
   a second motor/generator coupled to a high pressure (HP) shaft of the gas turbine engine;
   a system controller coupled to each of the gas turbine engine, the first motor/generator, and the second motor/generator, wherein the system controller is programmed to determine an amount of power sharing between the first motor/generator and the second motor/generator to meet a power demand and control a gas generator portion of the gas turbine engine using a total system power demand as a control variable;
   a first energy storage unit coupled to the first motor/generator,
   a second energy storage unit coupled to the second motor/generator,
   wherein the system controller is further programmed to meet the power demand, which includes an amount of engine thrust, by storing energy to and drawing the energy from at least one of the first energy storage unit and the second energy storage unit, in order to provide the amount of engine thrust as needed;
   wherein the power demand includes a total electrical load provided to an aircraft, and the controller is further programmed to control operation of at least one of the first motor/generator and the second motor/generator to meet the total electrical load; and
   wherein during a motoring mode when the first motor/generator operates as a motor, the system controller decelerates the aircraft to a reduced thrust by a fan of the aircraft by decreasing an amount of energy being provided by the first motor/generator; and
   wherein during a generating mode when the first motor/generator operates as a generator, and when the LP shaft provides power to the fan of the aircraft and to the first motor/generator, the system controller decelerates the aircraft to the reduced thrust by the fan by:
   i. when keeping an amount of combustion power constant, increasing the amount of energy provided to the first motor/generator; and
   ii. when reducing the amount of combustion power, first by increasing the amount of energy provided to the first motor/generator and then second by reducing the amount of energy provided to the first motor generator.

2. The subsystem of claim 1, wherein the power demand includes the amount of engine thrust and the controller is further programmed to control operation of the first motor/generator to provide the power demand via application of one of the motoring mode, a braking, a motoring release, and a braking release of the LP shaft to achieve the power demand.

3. The subsystem of claim 1, wherein the controller is further programmed to augment the amount of engine thrust produced in the gas turbine engine by affecting the amount of power sharing between the first motor/generator and the second motor/generator.

4. The subsystem of claim 1, wherein the power demand includes the amount of engine thrust and the controller is further programmed to control an amount of energy storage to and from the at least one of the first energy storage unit and the second energy storage unit in conjunction with controlling operation of one of the first motor/generator and the second motor/generator.

5. The subsystem of claim 1, wherein the power demand includes the total electrical load and the controller is further programmed to control an amount of energy storage to and from at least one of the first energy storage unit and the second energy storage unit in conjunction with controlling operation of the first motor/generator and the second motor/generator.

6. The subsystem of claim 1, wherein the amount of engine thrust is further reduced by extracting electrical power from the LP shaft and providing the electrical power to the first energy storage unit via the first motor/generator.

7. The subsystem of claim 1, wherein a fuel flow is decreased in the gas turbine engine to meet a reduced total system power demand due to the reduced thrust, and as a torque applied to the LP shaft decreases, electrical power extracted from the first motor/generator correspondingly decreases.

8. The subsystem of claim 1, wherein a platform electrical load includes overall electrical requirements for the aircraft, and wherein for a constant platform electrical load the deceleration of the aircraft to the reduced thrust further includes reducing an amount of electrical energy storage supplied by one of the first and second energy storage units while correspondingly decreasing an amount of torque to the LP shaft.

9. A method of controlling an integrated gas turbine engine, electrical power subsystem and thermal management subsystem for aerospace application as an integrated multivariable system, comprising:
   receiving engine thrust demand, which includes an amount of engine thrust, and electrical power demand from an aircraft;
   determining a total system power demand;
   determining an amount of power sharing between a first motor/generator and a second motor/generator to meet the total system power demand; wherein:
   the first motor/generator is coupled to a low pressure (LP) shaft of the gas turbine engine and to a first energy storage unit; and
   the second motor/generator is coupled to a high pressure (HP) shaft of the gas turbine engine and to a second energy storage unit;
   controlling a gas generator portion of the gas turbine engine using the total system power demand as a control variable;
   storing energy to provide the engine thrust to, and drawing the energy from, at least one of the first energy storage unit and second energy storage unit to provide the engine thrust;
   controlling operation of at least one of the first motor generator and the second motor/generator to meet the total system power demand that includes the electrical power demand provided to the aircraft;
   wherein during a motoring mode when the first motor/generator operates as a motor, decelerating the aircraft to a reduced thrust by a fan of the aircraft by decreasing an amount of energy being provided by the first motor/generator; and
   wherein during a generating mode when the first motor/generator operates as a generator, and when the LP shaft provides power to the fan of the aircraft and to the first motor/generator, decelerating the aircraft to the reduced thrust by the fan by:
   i. when keeping an amount of combustion power constant, increasing the amount of energy provided to the first motor/generator; and ii. when reducing the amount of combustion power, first by increasing the amount of energy provided to the first motor/generator and then second by reducing the amount of energy provided to the first motor generator.

10. The method of claim 9, further comprising controlling operation of the first motor/generator to provide the engine thrust demand via application of one of the motoring mode, a braking, a motoring release, and a braking release of the LP shaft to achieve the engine thrust demand.

11. The method of claim 9, further comprising augmenting the amount of engine thrust produced in the gas turbine engine by affecting the amount of power sharing between the first motor/generator and the second motor/generator.

12. The method of claim 9, wherein the total system power demand includes the amount of engine thrust, further comprising controlling an amount of energy storage to and from the at least one of the first energy storage unit and second energy storage unit in conjunction with controlling operation of one of the first motor/generator and the second motor/generator.

13. The method of claim 9, further comprising controlling an amount of energy storage to and from at least one of the first energy storage unit and the second energy storage unit in conjunction with controlling operation of the first motor/generator and the second motor/generator.

14. The method of claim 9, wherein the total system power demand includes the amount of engine thrust and an amount of power to the LP shaft.

15. The method of claim 9, further comprising reducing the engine thrust by extracting electrical power from the LP shaft and providing the electrical power to the first energy storage unit via the first motor/generator.

16. The method of claim 8, further comprising decreasing a fuel flow in the gas turbine engine to meet a reduced total system power demand due to the reduced thrust, and as a torque applied to the LP shaft decreases, electrical power extracted from the first motor/generator correspondingly decreases.

17. An integrated gas turbine engine, electrical power subsystem and thermal management subsystem, comprising:
   a first motor/generator coupled to a low pressure (LP) shaft of the gas turbine engine;
   a second motor/generator coupled to a high pressure (HP) shaft of the gas turbine engine;
   a system controller coupled to each of the gas turbine engine, the first motor/generator, and the second motor/generator, and programmed to determine an amount of power sharing between the first motor/generator and the second motor/generator to meet a power demand, and further programmed to meet the power demand, which includes an amount of engine thrust, by storing energy to and drawing the energy from at least one of a first energy storage unit and a second energy storage unit, in order to provide the amount of engine thrust as needed;
   wherein the power demand includes a total electrical load provided to an aircraft in a motoring mode and a generating mode, and the controller is further programmed to control operation of at least one of the first motor/generator and the second motor/generator to meet the total electrical load;
   wherein during a motoring mode when the first motor/generator operates as a motor, the system controller decelerates the aircraft to a reduced thrust by a fan of the aircraft by decreasing an amount of energy being provided by the first motor/generator; and
   wherein during a generating mode when the first motor/generator operates as a generator, and when the LP shaft provides power to the fan of the aircraft and to the first motor/generator, the system controller decelerates the aircraft to the reduced thrust by the fan by:
   i. when keeping an amount of combustion power constant, increasing the amount of energy provided to the first motor/generator; and
   ii. when reducing the amount of combustion power, first by increasing the amount of energy provided to the first motor/generator and then second by reducing the amount of energy provided to the first motor generator.

18. The subsystem of claim 17, wherein the power demand includes the amount of engine thrust and the controller is further programmed to control operation of the first motor/generator to provide the power demand via application of one of the motoring mode, a braking, a motoring release, and a braking release of the LP shaft to achieve the power demand.

19. The subsystem of claim 17, wherein the controller is further programmed to augment the amount of engine thrust produced in the gas turbine engine by affecting the power sharing between the first motor/generator and the second motor/generator.

20. The subsystem of claim 17, wherein the power demand includes the amount of engine thrust and the controller is further programmed to control an amount of energy storage to and from the at least one of the first energy storage unit and the second energy storage unit in conjunction with controlling operation of one of the first motor/generator and the second motor/generator.

\* \* \* \* \*

UNITED STATES PATENT AND TRADEMARK OFFICE
CERTIFICATE OF CORRECTION

| | | |
|---|---|---|
| PATENT NO. | : 10,583,931 B2 | Page 1 of 1 |
| APPLICATION NO. | : 14/585888 | |
| DATED | : March 10, 2020 | |
| INVENTOR(S) | : Cline et al. | |

It is certified that error appears in the above-identified patent and that said Letters Patent is hereby corrected as shown below:

In the Claims

At Column 13, Claim number 16, Line number 33, please change "claim 8" to "claim 9".

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*